United States Patent
Sheldon et al.

(10) Patent No.: US 12,059,621 B2
(45) Date of Patent: Aug. 13, 2024

(54) DYNAMIC GAME MODELS

(71) Applicant: SONY INTERACTIVE ENTERTAINMENT LLC, San Mateo, CA (US)

(72) Inventors: Jennifer Sheldon, San Mateo, CA (US); Elizabeth Juenger, San Mateo, CA (US); Sarah Karp, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 18/116,100

(22) Filed: Mar. 1, 2023

(65) Prior Publication Data
US 2023/0201719 A1    Jun. 29, 2023

Related U.S. Application Data

(63) Continuation of application No. 17/403,260, filed on Aug. 16, 2021, now Pat. No. 11,596,865.

(51) Int. Cl.
*A63F 13/50*      (2014.01)
*A63F 13/323*   (2014.01)
(Continued)

(52) U.S. Cl.
CPC ............ *A63F 13/56* (2014.09); *A63F 13/323* (2014.09); *A63F 13/537* (2014.09)

(58) Field of Classification Search
CPC .......... A63F 13/21; A63F 13/23; A63F 13/25; A63F 13/30; A63F 13/40; A63F 13/428;
(Continued)

(56) References Cited

U.S. PATENT DOCUMENTS

| 5,001,632 A | 3/1991 | Hall-Tipping |
| 5,947,868 A | 9/1999 | Dugan |

(Continued)

FOREIGN PATENT DOCUMENTS

| CN | 113031269 | 6/2021 |
| CN | 115634446 | 1/2023 |

(Continued)

OTHER PUBLICATIONS

European Application No. 22183356.9 Extended European Search Report dated Nov. 29, 2022.

(Continued)

*Primary Examiner* — Omkar A Deodhar
(74) *Attorney, Agent, or Firm* — Polsinelli LLP (57) ABSTRACT

Systems and methods for determining excessive motions or strained positions based on inputs associated with gameplay of game titles. A game intervention server may evaluate, based on learning models, posture, and physical motions of players for repetitive, unbalanced, or excessive motions, as well as gameplay quality patterns, and compare to thresholds for identifying unhealthy conditions. The game intervention server may make recommendations regarding breaks, stretches, warm-up/cool-down, curbing extended periods of play, etc. Notifications may be overlaid on screen with option to pause play without exiting game session. In-game events and requirements may also be adjusted based on learned insights to avoid excessive movement or counteract unbalanced movement.

17 Claims, 5 Drawing Sheets

(51) Int. Cl.
*A63F 13/537* (2014.01)
*A63F 13/56* (2014.01)

(58) Field of Classification Search
CPC ........ A63F 13/45; A63F 13/50; A63F 13/533; A63F 13/79; A63F 13/85; A63F 2300/6027
See application file for complete search history.

(56) References Cited

U.S. PATENT DOCUMENTS

| | | | |
|---|---|---|---|
| 6,375,572 | B1 | 4/2002 | Masuyama et al. |
| 8,109,858 | B2 | 2/2012 | Redmann |
| 8,313,377 | B2 | 11/2012 | Zalewski |
| 8,332,544 | B1 | 12/2012 | Ralls et al. |
| 8,858,331 | B2 | 10/2014 | Song et al. |
| 9,533,228 | B2 | 1/2017 | Dugan |
| 11,014,002 | B2 | 5/2021 | Dugan |
| 11,596,865 | B1 | 3/2023 | Sheldon et al. |
| 11,707,680 | B2 | 7/2023 | Bartolome et al. |
| 2004/0077462 | A1 | 4/2004 | Brown et al. |
| 2004/0127272 | A1 | 7/2004 | Park et al. |
| 2006/0229163 | A1 | 10/2006 | Waters |
| 2008/0227546 | A1 | 9/2008 | Roberts |
| 2009/0098979 | A1* | 4/2009 | Coshott ................... A63F 13/10 482/4 |
| 2009/0098980 | A1 | 4/2009 | Waters |
| 2010/0004097 | A1 | 1/2010 | D'Eredita |
| 2010/0292006 | A1 | 11/2010 | Terrell et al. |
| 2011/0009241 | A1 | 1/2011 | Lane |
| 2011/0034300 | A1 | 2/2011 | Hall |
| 2011/0086707 | A1 | 4/2011 | Loveland |
| 2011/0173204 | A1 | 7/2011 | Murillo et al. |
| 2013/0032634 | A1 | 2/2013 | McKirdy |
| 2013/0059660 | A1 | 3/2013 | Zalewski |
| 2014/0243154 | A1 | 8/2014 | Park |
| 2014/0274564 | A1 | 9/2014 | Greenbaum |
| 2016/0030834 | A1 | 2/2016 | Brown et al. |
| 2016/0077547 | A1 | 3/2016 | Aimone |
| 2016/0082353 | A1* | 3/2016 | Christovale ........... A63F 13/533 463/7 |
| 2016/0184634 | A1 | 6/2016 | Yanev et al. |
| 2016/0228771 | A1* | 8/2016 | Watson ................. A63F 13/285 |
| 2016/0279514 | A1 | 9/2016 | Fung |
| 2017/0277254 | A1* | 9/2017 | Osman ................... A63F 13/32 |
| 2017/0282078 | A1* | 10/2017 | Dugan ................... A63F 13/24 |
| 2017/0365101 | A1 | 12/2017 | Samec |
| 2019/0060708 | A1 | 2/2019 | Fung |
| 2019/0126099 | A1 | 5/2019 | Hoang |
| 2019/0163270 | A1 | 5/2019 | Da Silva et al. |
| 2019/0371114 | A1 | 12/2019 | Diefenbach et al. |
| 2020/0164247 | A1 | 5/2020 | Kline et al. |
| 2020/0188774 | A1 | 6/2020 | Fung |
| 2021/0001171 | A1* | 1/2021 | Fung ................. A63B 22/0292 |
| 2021/0202067 | A1 | 7/2021 | Williams et al. |
| 2022/0040535 | A1 | 2/2022 | Warren |
| 2022/0143464 | A1 | 5/2022 | Nishimoto et al. |
| 2023/0021350 | A1 | 1/2023 | Gould |
| 2023/0024653 | A1 | 1/2023 | Gould |
| 2023/0052493 | A1 | 2/2023 | Sheldon et al. |

FOREIGN PATENT DOCUMENTS

| | | |
|---|---|---|
| CN | 115705337 | 2/2023 |
| CN | 115712343 | 2/2023 |
| EP | 4 122 564 | 1/2023 |
| EP | 4 122 565 | 1/2023 |
| EP | 4 140 550 | 3/2023 |
| JP | 2023-016005 | 2/2023 |
| JP | 2023-016006 | 2/2023 |
| JP | 2023-027007 | 3/2023 |
| TW | 202313164 | 4/2023 |
| WO | WO 2016/126522 | 8/2016 |
| WO | WO 2017/194770 | 11/2017 |

OTHER PUBLICATIONS

European Application No. 22183350.2 Extended European Search Report dated Nov. 23, 2022.
Taiwan Application No. 111123358 Office Action and Search Report dated Feb. 24, 2023.
European Application No. 22185682.6 Extended European Search Report dated Feb. 9, 2023.
U.S. Appl. No. 17/411,655 Office Action mailed Oct. 6, 2022.
U.S. Appl. No. 17/407,393 Office Action mailed Feb. 14, 2023.
U.S. Appl. No. 17/407,393, Final Office Action dated May 31, 2023.

* cited by examiner

FIG. 5 ically, the present technology pertains to evaluation of patterns of input data associated with gameplay of interactive content titles to provide learned insights for counteracting unbalanced movements.

DYNAMIC GAME MODELS

CROSS-REFERENCE TO RELATED APPLICATION

This application is a continuation of U.S. patent application Ser. No. 17/403,260 filed Aug. 16, 2021, now U.S. Pat. No. 11,596,865, which is incorporated by reference herein in its entirety.

BACKGROUND OF THE INVENTION

1. Field of the Invention

The present technology pertains to addressing unhealthy conditions associated with repetitive or unbalanced motions during interaction with interactive content titles. More specifically, the present technology pertains to evaluation of patterns of input data associated with gameplay of interactive content titles to provide learned insights for counteracting unbalanced movements.

2. Description of the Related Art

Gameplay of some presently available interactive content titles may entail repetitive and/or unbalanced motions that may include finger movements, misaligned posture, and/or awkward limb positions. When performed or held over extended periods of time, such repetitive movements or improper positioning of the body or limbs may result in stress injuries or other detrimental physiological effects. For example, repetitive stress injury (RSI) is a common risk associated with long hours of gaming. Hand injuries like "gamer's thumb" may be due to repetitive strain on the thumb's tendons may lead to inflammation, pain, and limited movement. Other similar issues may arise with respect to, for example, back posture and placement of the arms and legs in positions over an extended period, which may cause poor blood flow.

There is a need in the art, therefore, for improved systems and methods for detecting risk factors indicative of excessive motions or strained positions based on inputs associated with gameplay of game titles and notifying players of the same.

SUMMARY OF THE CLAIMED INVENTION

Disclosed are systems, apparatuses, methods, computer readable medium, and circuits for determining excessive motions or strained positions based on inputs associated with gameplay of game titles. According to at least one example, a method includes: storing a dynamic intervention model in memory, wherein the dynamic intervention model includes a plurality of different physical conditions each associated with one or more alert thresholds; receiving input data over a communication network from a plurality of input devices during a gameplay session of an interactive content title; categorizing one or more player movements exhibited by a player in a real-world environment during the gameplay session based on an evaluation of the input data, the categorized movements corresponding to one or more of the physical conditions; identifying that an alert threshold of a corresponding physical conditions in accordance with the dynamic intervention model has been met; generating a display of a dynamic intervention notification overlaying a virtual environment of the gameplay session.

For example, the game intervention server stores a dynamic intervention model in memory, wherein the dynamic intervention model includes a plurality of different physical conditions each associated with one or more alert thresholds; receives input data over a communication network from a plurality of input devices during a gameplay session of an interactive content title; categorizes one or more player movements exhibited by a player in a real-world environment during the gameplay session based on an evaluation of the input data, the categorized movements corresponding to one or more of the physical conditions; identifies that an alert threshold of a corresponding physical conditions in accordance with the dynamic intervention model has been met; generates a display of a dynamic intervention notification overlaying a virtual environment of the gameplay session.

In another example, a game intervention server for determining excessive motions or strained positions based on inputs associated with gameplay of game titles is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the game intervention server to: store a dynamic intervention model in memory, wherein the dynamic intervention model includes a plurality of different physical conditions each associated with one or more alert thresholds; receive input data over a communication network from a plurality of input devices during a gameplay session of an interactive content title; categorize one or more player movements exhibited by a player in a real-world environment during the gameplay session based on an evaluation of the input data, the categorized movements corresponding to one or more of the physical conditions; identify that an alert threshold of a corresponding physical conditions in accordance with the dynamic intervention model has been met; generate a display of a dynamic intervention notification overlaying a virtual environment of the gameplay session.

DETAILED DESCRIPTION

Aspects of the present disclosure include systems and methods for determining excessive motions or strained positions based on inputs associated with gameplay of game titles. A game intervention server may evaluate, based on learning models, posture, and physical motions of players for repetitive, unbalanced, or excessive motions, as well as gameplay quality patterns, and compare to thresholds for identifying unhealthy conditions. The game intervention server may make recommendations regarding breaks, stretches, warm-up/cool-down, curbing extended periods of play, etc. Notifications may be overlaid on screen with option to pause play without exiting game session. Timing of breaks may also be applicable to addressing digital addiction. In-game events and requirements may also be adjusted based on learned insights to avoid excessive movement or counteract unbalanced movement.

Figure 1:
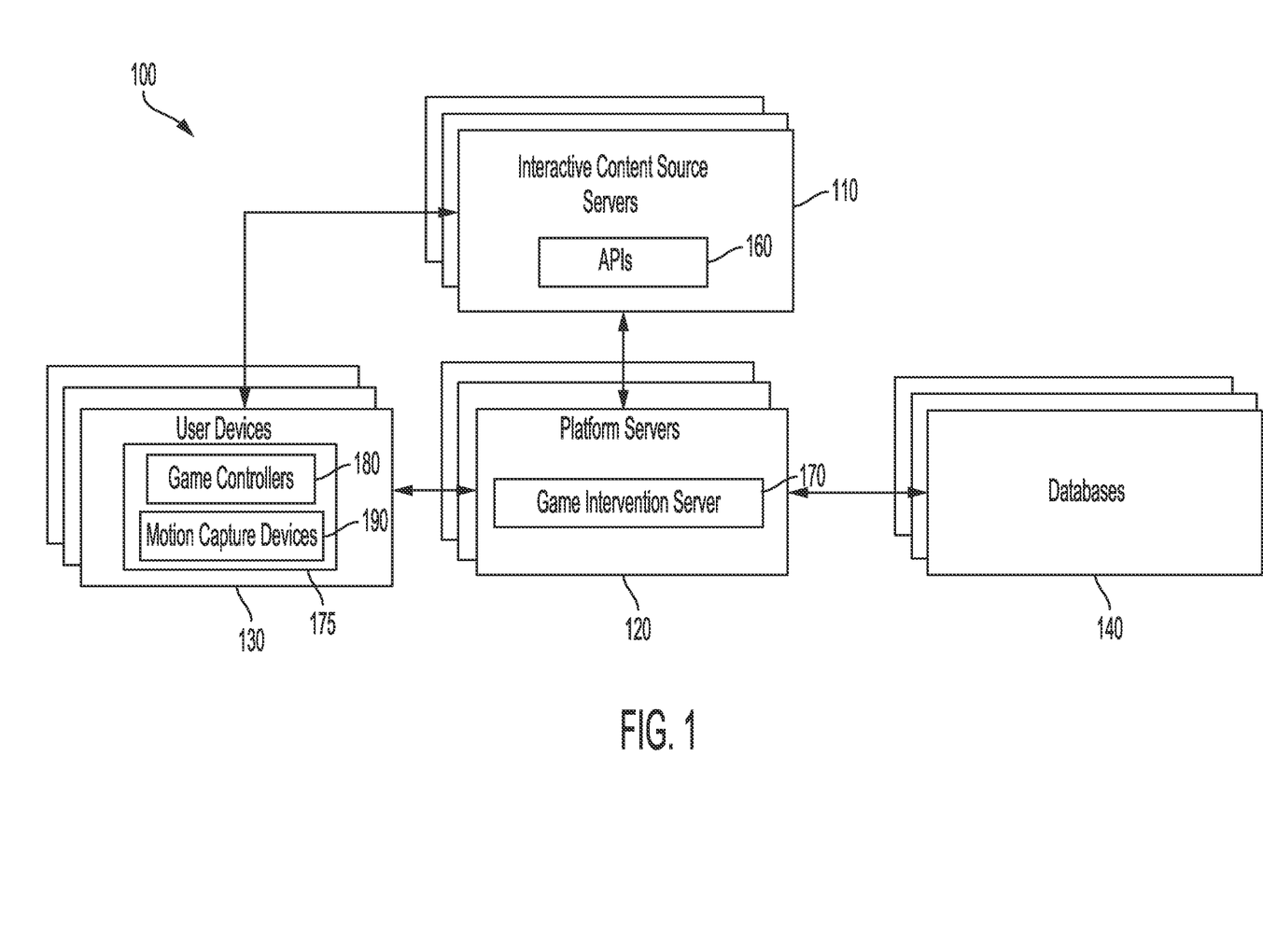
FIG. 1 illustrates an exemplary network environment in which a system for determining excessive motions or strained positions based on inputs associated with gameplay of game titles may be implemented.

FIG. 1 illustrates an exemplary network environment 100 in which a system for determining excessive motions or strained positions based on inputs associated with gameplay of game titles may be implemented. The network environment 100 may include one or more interactive content source servers 110 that provide interactive media content, one or more platform servers 120, one or more user devices 130, and one or more databases 140. For example, interactive content source servers 110 may maintain, stream, and host interactive media available to stream on a user device 130 over a communication network. Such interactive content source servers 110 may be implemented in the cloud (e.g., one or more cloud servers). The platform servers 120 may be responsible for communicating with the different interactive content source servers 110, databases 140, and user devices 130. Such platform servers 120 may be implemented on one or more cloud servers.

The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

Streaming media and associated object data may be provided through an application programming interface (API) 160, which allows various types of interactive content source servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript).

The user device 130 may include input generator devices 175, which may include game controllers 180 that include input components such as buttons, grip buttons, thumb sticks, joysticks, (adaptive) triggers, touch-detection pads, etc. Any of these input components may be triggers to send controller data that may cause the platform servers 120 and/or the interactive content source servers 110 to perform a certain task, such as move an avatar in a game title. The controller data may further be mapped to certain physical movements by the player in real life that are required for the respective input component to be triggered. As such, the physical movements by the player may be tracked to determine whether certain movements over a period of time are in excess of a threshold amount set by a intervention threshold rule.

In addition, the input generator devices 175 may further include motion capture devices 190, which may range from camera-related devices that capture movement of the player to gyroscopic component integrated in a controller or VR set, that can determine posture or whether the game controller 180 is being held in an unnatural position that may result in poor circulation.

The databases 140 may be stored on the platform server 120, the media streaming servers 110, on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2:
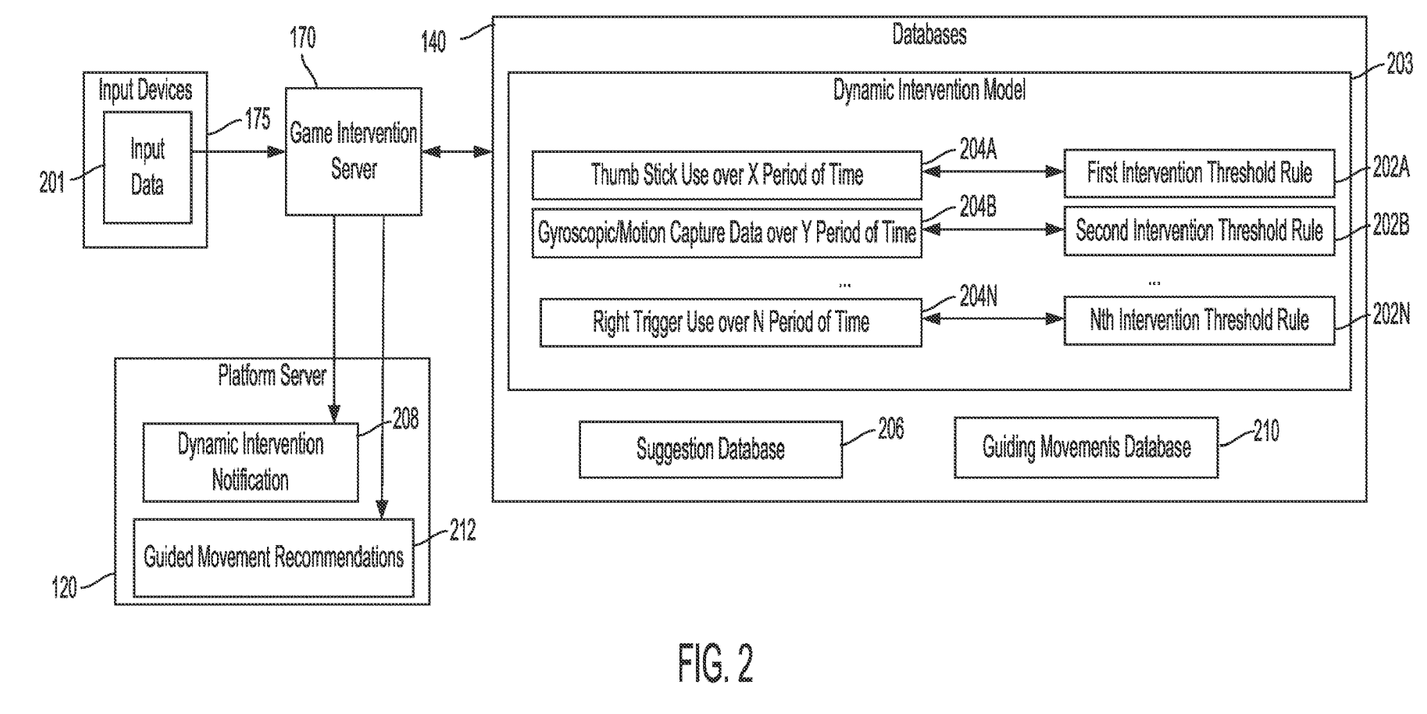
FIG. 2 is a block diagram of an exemplary game intervention server for determining excessive motions or strained positions based on inputs associated with gameplay of game titles.

FIG. 2 is a block diagram of an exemplary game intervention server for determining excessive motions or strained positions based on inputs associated with gameplay of game titles. Input data 201 may first be captured at the input generator devices 175. The input data 201 may triggered based on moving or pressing of buttons or sticks on the game controller 180 or relayed as sampled motion capture data or gyroscopic data that may be further analyzed to determine certain movements or positions of the player. The input data 201 may be any data set that is mappable to physical motion of the player during gameplay.

The input data 201 may be received by the game intervention server 170 and compared with intervention threshold rules 202A, 202B, . . . 202N (collectively, 202) of a dynamic intervention model 203. The input data 201 may be associated to categorize with certain movements by certain fingers or limbs or postures. For example, a thumb stick use over X period of time 204A may be stored and compared to a first intervention threshold rule 202A until a threshold is met such that an intervention suggestion notification 208 is instructed to be generated. The first intervention threshold rule 202A may require that the player not hold and move the thumb stick without any breaks for more than 10 minutes at a time before the associated intervention suggestion notification 208 is instructed to be generated.

As another example, gyroscopic or motion capture data captured over Y period of time 204B may be compared to a second intervention threshold rule 202B. The second intervention threshold rule 202B may recommend that the player stand and stretch if the player has been sitting for more than 30 minutes without moving. Or the second intervention threshold rule 202B may be even more specific and monitors the posture of the player and if the player is hunched for more than 10 minutes without moving, the associated intervention suggestion notification 208 is instructed to be generated.

There may be any number of intervention threshold rules 202N, and such rules may be preset by the game intervention server 170 and may be further customized by the player before being stored in databases 140. For example, a specific right trigger use over a period of time 204N may be customized by the player to be set that the player may not use the right trigger at a certain speed without any breaks for more than 2 minutes at a time given their right index finger's predisposition for injuries.

Once an intervention threshold rule 202 has been met, the associated intervention suggestion notification 208 is retrieved from the notification data 206 and sent to the platform server 120 to be displayed and overlaying an ongoing game title, without disrupting the game title. The notification may be as noticeable as a normal notification or may be a special signal, such as a discreet warning sign at the edge of the user device 130 displaying the game title. The special signal may also be a haptic response, a sound, or other forms of notification that may be chosen to be the least disruptive but noticeable way to capture the attention of the player depending on the game title.

If the player clicks on the notification or pauses the game and proceed with receiving guided movements, associated guided movement recommendations 212 may be presented at the user device 130 for the player to follow along. The guided movement recommendations 212 may be a series of counterbalancing movements and/or stretches that counterbalance the motions associated with what triggered the intervention suggestion notification 208. For example, if excessive motion is associated with the right trigger caused intervention suggestion notification 208, the guided movement recommendations 212 may be finger movements that stretch and extend the right index finger outward. If the excessive position is associated with poor posture, the guided movement recommendations 212 may be back and arm stretches that relieve tightness associated with hunching over.

In addition, tailored feedback based on an extent to which input data 201, such as gyroscopic data or motion capture data, indicate adherence to the guided movement recommendations 212 may be provided to provide insights to adherence and/or to customize the guided movement recommendations 212 based on how the player is able to follow along.

Figure 3:
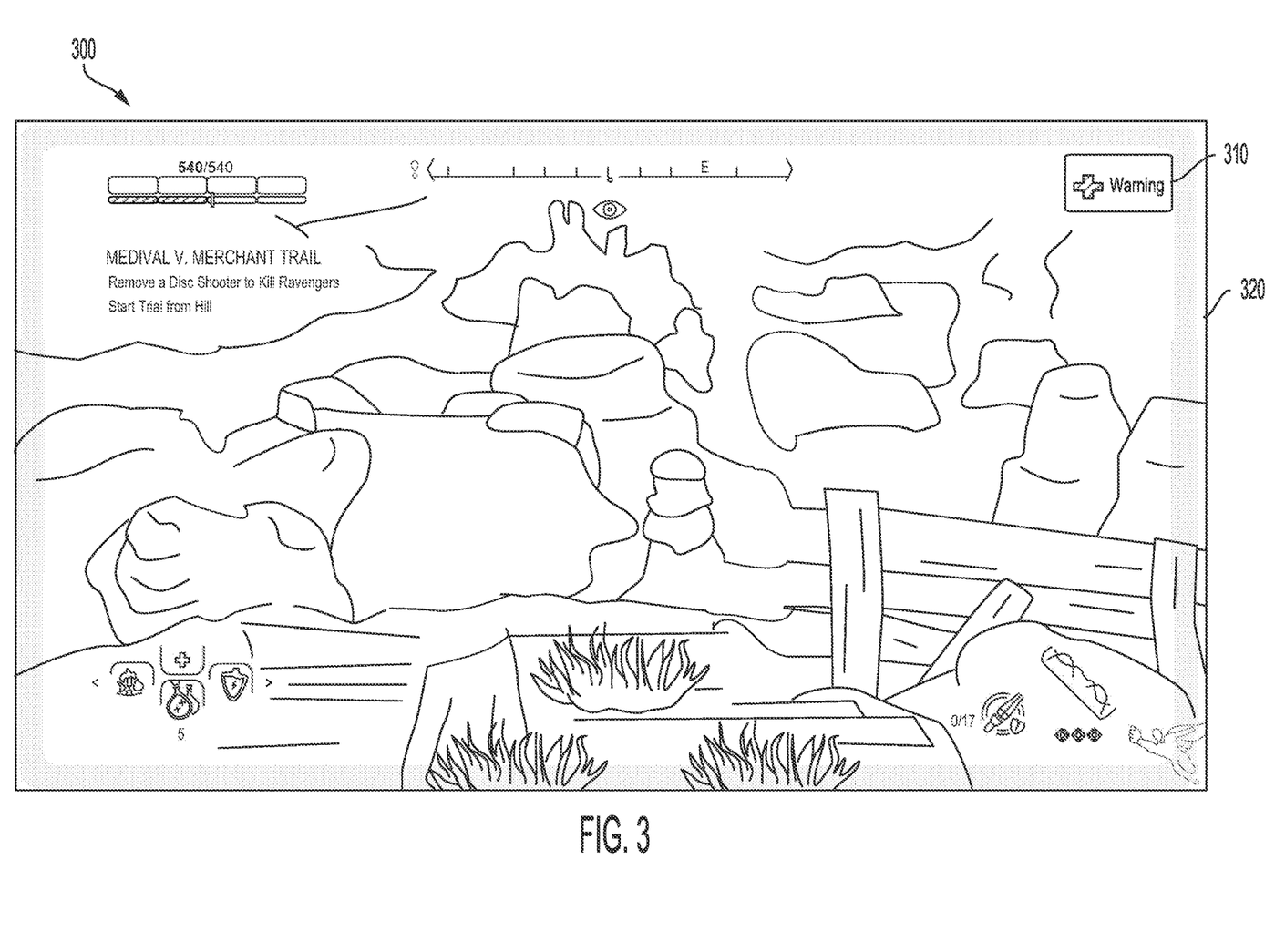
FIG. 3 illustrates an exemplary graphical user interface in which a dynamic intervention notification is overlaid on a virtual environment of a current gameplay session without exiting the gameplay.

FIG. 3 illustrates an exemplary graphical user interface in which a dynamic intervention notification is overlaid on a virtual environment of a current gameplay session without exiting the gameplay. During gameplay, as input data 201 for controlling gameplay are received, the input data 201 are also separately considered for determining excessive motion, such that notifications or signals for excessive motion may be triggered and/or displayed. For example, as shown in FIG. 3, a warning notification 310 may be displayed as an overlay to the gameplay display in the graphical user interface 300. The notification 210 may further be selected and the associated guided movement recommendations 212 may be displayed. A symbol on the notification 210 may indicate what kind of input data 201 associated with the excessive motion is so that the player may quickly determine whether there is any discomfort associated with using the associated controller triggers. For example, in FIG. 3, the associated controller trigger shown in a direction pad.

Alternatively, or in addition to the notification 210, a warning signal 320 may be displayed. For example, the warning signal 320 may be in the form of a border as shown in FIG. 3. The warning signal 320 may be in any for that can signal to the player, without interrupting the game, that there is an intervention suggestion available due to excessive motion or poor posture.

Figure 4:
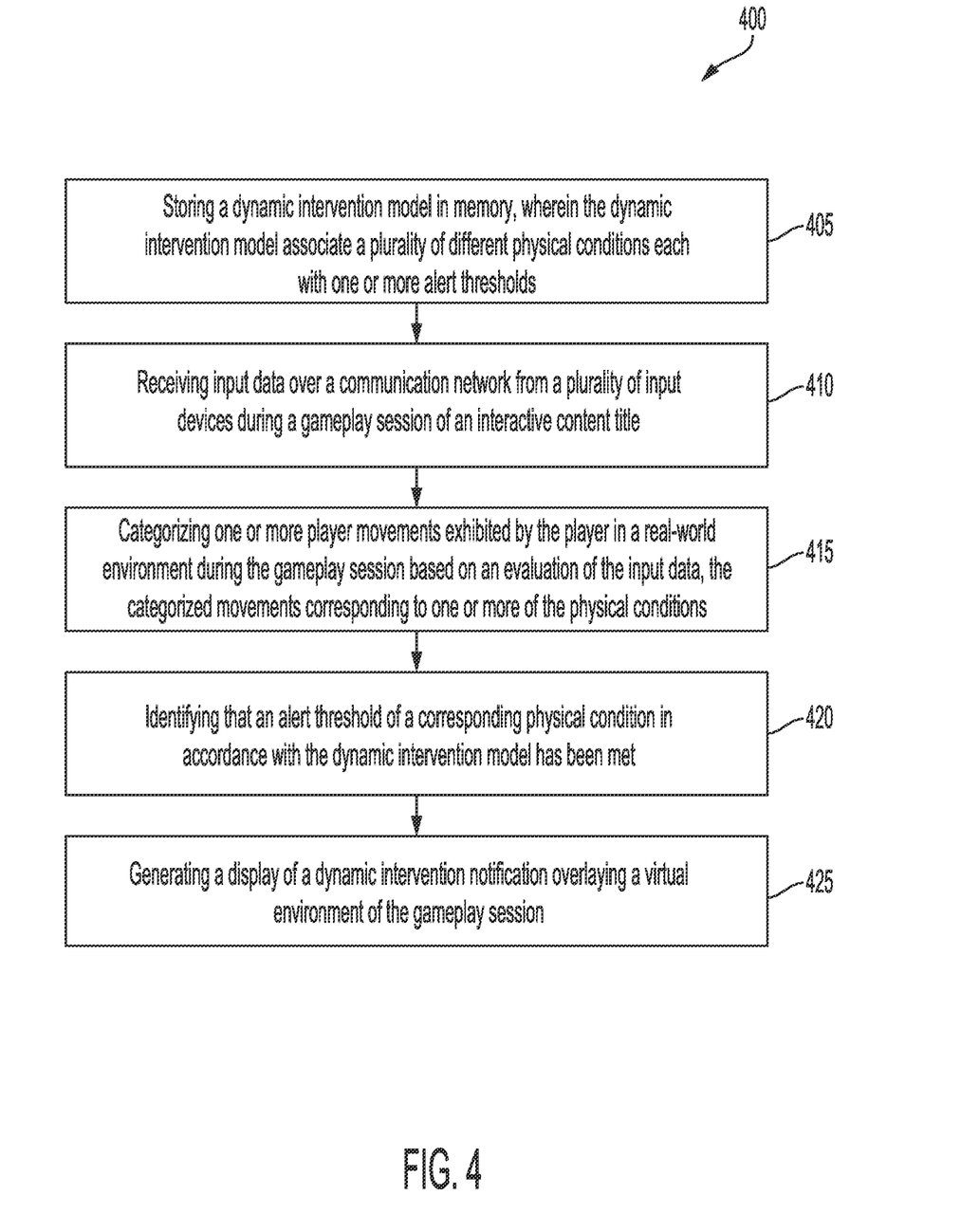
FIG. 4 is a flowchart of an exemplary method for determining excessive motions or strained positions based on inputs associated with gameplay of game titles.

FIG. 4 is a flowchart of an exemplary method for determining excessive motions or strained positions based on inputs associated with gameplay of game titles. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes storing a dynamic intervention model in memory at block 405. For example, the databases 140 illustrated in FIGS. 1 and 2 may store a dynamic intervention model in memory. The dynamic intervention suggestions include at least one of break recommendations, stretching recommendations, warm-up or cool-down recommendations, and counter-balancing recommendations. The dynamic intervention model includes a plurality of different physical conditions each associated with one or more alert thresholds. The dynamic intervention model further includes one or more dynamic intervention suggestions associated with each physical condition.

According to some examples, the method includes receiving input data over a communication network from a plurality of input devices during a gameplay session of an interactive content title at block 410. For example, the input devices illustrated in FIGS. 1 and 2 may receive input data over a communication network from a plurality of input devices during a gameplay session of an interactive content title. The input devices include at least one of a game controller, a virtual reality set, a camera, and a mobile device.

According to some examples, the method includes categorizing one or more player movements exhibited by a player in a real-world environment during the gameplay session based on an evaluation of the input data, the categorized movements corresponding to one or more of the physical conditions at block 415. The physical condition may be associated with excessive motion of a particular body part, such as a finger, or poor posture/extended positions that are determined based on the input data. For example, the game intervention server 170 illustrated in FIGS. 1 and 2 may categorize one or more player movements exhibited by a player in a real-world environment during the gameplay session based on an evaluation of the input data, the categorized movements corresponding to one or more of the physical conditions.

According to some examples, the method includes identifying that an alert threshold of a corresponding physical conditions in accordance with the dynamic intervention model has been met at block 420. For example, the game intervention server 170 illustrated in FIGS. 1 and 2 may identify that an alert threshold of a corresponding physical conditions in accordance with the dynamic intervention model has been met.

According to some examples, the method includes generating a display of a dynamic intervention notification overlaying a virtual environment of the gameplay session at block 425. For example, the platform server 120 illustrated in FIGS. 1 and 2 may generate a display of a dynamic intervention notification overlaying a virtual environment of the gameplay session. The display of the dynamic intervention notification is overlaid on the virtual environment without exiting the gameplay session. The dynamic intervention notification includes one or more different dynamic intervention suggestions, and further comprising.

According to some examples, the method includes identifying that the player movements include a set of unbalanced movements. For example, the game intervention server 170 illustrated in FIGS. 1 and 2 may identify that the player movements include a set of unbalanced movements.

According to some examples, the method includes measuring an extent of imbalance. For example, the game intervention server 170 illustrated in FIGS. 1 and 2 may measure an extent of imbalance. The dynamic intervention notification includes a dynamic intervention suggestion regarding counter-balancing the unbalanced movements in accordance with the measured extent of the imbalance.

According to some examples, the method includes receiving a selection to proceed with one of the dynamic intervention suggestions. For example, the game intervention server 170 illustrated in FIGS. 1 and 2 may receive a selection to proceed with one of the dynamic intervention suggestions.

According to some examples, the method includes outputting guided movement recommendations regarding the selected dynamic intervention suggestion. For example, the game intervention server 170 illustrated in FIGS. 1 and 2 may output guided movement recommendations regarding the selected dynamic intervention suggestion. The outputted guided movement recommendations include one or more illustrations of intervention movements.

According to some examples, the method includes receiving additional input data as the guided movement recommendations are outputted. For example, the game intervention server 170 illustrated in FIGS. 1 and 2 may receive additional input data as the guided movement recommendations are outputted.

According to some examples, the method includes providing tailored feedback based on an extent to which gyroscopic data or motion capture data indicate adherence to the intervention movements. For example, the game intervention server 170 illustrated in FIGS. 1 and 2 may provide tailored feedback based on an extent to which gyroscopic data or motion capture data indicate adherence to the intervention movements.

Figure 5:
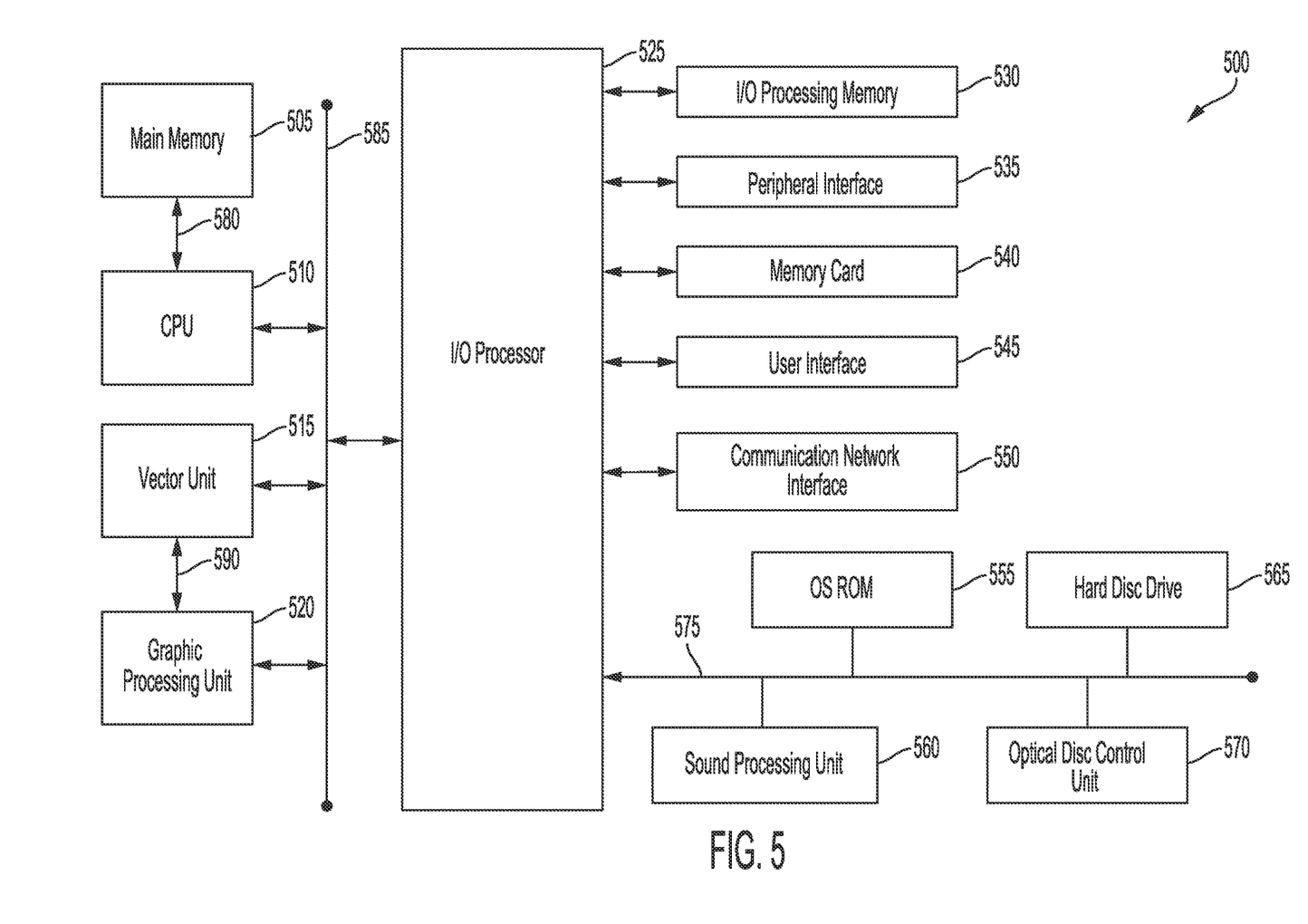
FIG. 5 is a block diagram of an exemplary electronic entertainment system that may be used in embodiments of the present invention.

FIG. 5 is a block diagram of an exemplary electronic entertainment system 500 that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct an avatar in a game to perform some specified action.

The present disclosure pertains to an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for dynamic modeling for gameplay, the method comprising:
   storing a dynamic model in memory, wherein the dynamic model includes a plurality of alert thresholds each associated with a set of movements that correspond to at least one physical condition, the at least one physical condition associated with a counterbalancing movement;
   receiving data captured by one or more input devices regarding a player in a real-world environment during an interactive session of an interactive content title, the data received over a communication network;
   identifying one or more patterns of physical motions exhibited by the player based on the captured data;
   determining that the identified patterns of physical motions indicate a physical condition associated with an identified one of the stored alert thresholds in accordance with the dynamic model; and
   generating a guided movement recommendation based on the counterbalancing movement of the indicated physical condition.

2. The method of claim 1, further comprising:
   monitoring one or more subsequent physical movements by the player in the real-world environment as the guided movement recommendation is outputted; and
   generating custom feedback based on an extent to which gyroscopic data or motion capture data regarding the subsequent physical movements indicate adherence to the counterbalancing movement.

3. The method of claim 2, wherein the indicated physical condition corresponds to a set of unbalanced movements, and further comprising measuring an extent of imbalance of the set of unbalanced movements, wherein generating the custom feedback is based on the measured extent of the imbalance.

4. The method of claim 1, further comprising generating a warning notification that the player has met one of the alert threshold, wherein the warning notification is selectable to generate a display of the guided movement recommendation.

5. The method of claim 4, wherein a display of the warning notification is overlaid on a display of a virtual environment of the interactive session without exiting the interactive session.

6. The method of claim 1, wherein the dynamic model further includes one or more dynamic suggestions associated with each physical condition, and wherein the dynamic suggestions include at least one of break recommendation, stretching recommendation, warm-up or cool-down recommendation, and counter-balancing recommendation.

7. The method of claim 1, further comprising identifying a posture of the player in the real-world environment, wherein determining that the identified patterns of physical motions indicate the physical condition is further based on the identified posture.

8. The method of claim 1, wherein the input devices include at least one of a game controller, a virtual reality set, a camera, and a mobile device, and wherein the identified patterns of physical motions.

9. A system for dynamic modeling for gameplay, the system comprising:
   memory that stores a dynamic model that includes a plurality of alert thresholds each associated with a set of movements that correspond to at least one physical condition, the at least one physical condition associated with a counterbalancing movement;
   a communication interface that receives data captured by one or more input devices regarding a player in a real-world environment during an interactive session of an interactive content title, the data received over a communication network; and
   a processor that executes instructions stored in memory, wherein the processor executes the instructions to:
      identify one or more patterns of physical motions exhibited by the player based on the captured data;
      determine that the identified patterns of physical motions indicate a physical condition associated with an identified one of the stored alert thresholds in accordance with the dynamic model; and
      generate a guided movement recommendation based on the counterbalancing movement of the indicated physical condition.

10. The system of claim 9, wherein the communication interface further receives data from the input devices monitoring one or more subsequent physical movements by the player in the real-world environment as the guided movement recommendation is outputted, and wherein the processor executes further instructions to generate custom feedback based on an extent to which gyroscopic data or motion capture data regarding the subsequent physical movements indicate adherence to the counterbalancing movement.

11. The system of claim 10, wherein the indicated physical condition corresponds to a set of unbalanced movements, and wherein the processor executes further instructions to measure an extent of imbalance of the set of unbalanced movements, wherein generating the custom feedback is based on the measured extent of the imbalance.

12. The system of claim 9, wherein the processor executes further instructions to generate a warning notification that the player has met one of the alert threshold, wherein the warning notification is selectable to generate a display of the guided movement recommendation.

13. The system of claim 12, wherein a display of the warning notification is overlaid on a display of a virtual environment of the interactive session without exiting the interactive session.

14. The system of claim 9, wherein the dynamic model further includes one or more dynamic suggestions associated with each physical condition, and wherein the dynamic suggestions include at least one of break recommendation, stretching recommendation, warm-up or cool-down recommendation, and counter-balancing recommendation.

15. The system of claim 9, wherein the processor executes further instructions to identify a posture of the player in the real-world environment, wherein determining that the identified patterns of physical motions indicate the physical condition is further based on the identified posture.

16. The system of claim 9, wherein the input devices include at least one of a game controller, a virtual reality set, a camera, and a mobile device, and wherein the identified patterns of physical motions.

17. A non-transitory computer-readable storage medium comprising instructions executable by a computing system to perform method for dynamic modeling for gameplay, the method comprising:
  storing a dynamic model in memory, wherein the dynamic model includes a plurality of alert thresholds each associated with a set of movements that correspond to at least one physical condition, the at least one physical condition associated with a counterbalancing movement;
  receiving data captured by one or more input devices regarding a player in a real-world environment during an interactive session of an interactive content title, the data received over a communication network;
  identifying one or more patterns of physical motions exhibited by the player based on the captured data;
  determining that the identified patterns of physical motions indicate a physical condition associated with an identified one of the stored alert thresholds in accordance with the dynamic model; and
  generating a guided movement recommendation based on the counterbalancing movement of the indicated physical condition.

* * * * *